US007018491B2

(12) United States Patent
Keil et al.

(10) Patent No.: US 7,018,491 B2
(45) Date of Patent: Mar. 28, 2006

(54) METHOD FOR THE APPLICATION OF SELF-ADHESIVE LABELS

(75) Inventors: Goeran Keil, Berlin (DE); Andre Rompe, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 80 days.

(21) Appl. No.: 10/485,047

(22) PCT Filed: Jul. 19, 2002

(86) PCT No.: PCT/DE02/02657

§ 371 (c)(1), (2), (4) Date: Jan. 23, 2004

(87) PCT Pub. No.: WO03/016145

PCT Pub. Date: Feb. 27, 2003

(65) Prior Publication Data

US 2004/0194868 A1 Oct. 7, 2004

(30) Foreign Application Priority Data

Jul. 25, 2001 (DE) ................................ 101 36 294

(51) Int. Cl.
*B32B 31/20* (2006.01)

(52) U.S. Cl. ........................ 156/64; 156/351; 156/361; 156/362

(58) Field of Classification Search .................. 156/64, 156/351, 361, 366, 367, DIG. 45, DIG. 46, 156/DIG. 47

See application file for complete search history.

(56) References Cited

U.S. PATENT DOCUMENTS

| | | | | |
|---|---|---|---|---|
| 2,555,325 | A | 6/1951 | Doane | 216/30 |
| 3,628,408 | A | 12/1971 | Rod | 83/175 |
| 3,660,208 | A | 5/1972 | Hubbard | 156/571 |
| 3,772,123 | A | 11/1973 | Clark et al. | 156/357 |
| 3,883,380 | A | 5/1975 | Kirk et al. | 156/60 |
| 4,188,252 | A | 2/1980 | Brown | 156/361 |
| 4,421,587 | A | 12/1983 | Guenther et al. | 156/256 |
| 4,585,506 | A | 4/1986 | Matsuguchi | 156/361 |
| 4,589,945 | A | 5/1986 | Polit | 156/497 |
| 5,102,485 | A | 4/1992 | Keeler et al. | 156/256 |
| 5,200,007 | A | 4/1993 | Svyatsky | 156/64 |
| 5,413,651 | A * | 5/1995 | Otruba | 156/64 |
| 5,531,853 | A | 7/1996 | Cubow et al. | 156/521 |
| 5,556,492 | A * | 9/1996 | Vonderhorst et al. | 156/64 |
| 5,560,293 | A | 10/1996 | Boreali et al. | 101/288 |
| 5,607,526 | A | 3/1997 | Buckley | 156/64 |

(Continued)

FOREIGN PATENT DOCUMENTS

DE 3622502 A1 7/1986

(Continued)

*Primary Examiner*—George Koch
(74) *Attorney, Agent, or Firm*—Philip G. Meyers

(57) ABSTRACT

A method of applying labels to flat objects transported along a conveying path includes determining the acceleration time from the starting time of a pressure and applicator drum as far as the peripheral speed corresponding to the defined, average transport speed of the objects at a circumferential region accommodating the labels and measuring the times at which the front edge of the respective object passes two sensor devices located one after another in the transport path before the pressure and applicator drum and determining the starting time of the pressure and applicator drum in accordance with a mathematical relationship.

16 Claims, 3 Drawing Sheets

U.S. PATENT DOCUMENTS

| | | | | |
|---|---|---|---|---|
| 5,674,345 | A | 10/1997 | Nash | 156/264 |
| 5,783,032 | A | 7/1998 | O'Callaghan et al. | 156/556 |
| 5,888,343 | A | 3/1999 | Olson | 156/556 |
| 5,922,169 | A | 7/1999 | Chodacki et al. | 156/521 |
| 6,006,669 | A | 12/1999 | Klein et al. | 101/485 |
| 2003/0159784 | A1 | 8/2003 | Francke et al. | 156/552 |
| 2003/0168178 | A1 | 9/2003 | Francke et al. | 156/556 |

FOREIGN PATENT DOCUMENTS

| | | |
|---|---|---|
| EP | E 31 691 | 1/1981 |
| WO | WO 99/06285 | 2/1999 |
| WO | WO 00/68091 | 11/2000 |
| WO | WO 00/73152 A1 | 12/2000 |
| WO | WO 01/05590 A1 | 1/2001 |

* cited by examiner

METHOD FOR THE APPLICATION OF SELF-ADHESIVE LABELS

TECHNICAL FIELD

The invention relates to a method for the application of self-adhesive labels to flat objects transported along a conveying path, by means of a pressure and applicator drum driven under control.

BACKGROUND OF THE INVENTION

During the processing of flat items of mail, in particular letters, postcards and so on, by postal delivery companies, the task arises of secure and rapid application of labels to flat items of mail. One example of this is the automatic forwarding of items of mail. In this case, items of mail to be forwarded are sorted out and addressed in accordance with predefined data, which is stored in a database. These items of mail have a label stuck to them, which covers both the old address and a barcode possibly applied to the surface of the item of mail. The label is then provided with a new barcode and the appropriate new address. The application of the label is in this case carried out in apparatus which is integrated into automatic letter distribution systems. The arrival of items of mail in such distribution systems is different in terms of format, weight and thickness. The items of mail are conveyed in such systems at, for example, speeds of 3.6 m/sec, which places high requirements on the speed at which the application of the labels must be carried out, and also on the exact positioning of the labels. Furthermore, the handling and, in particular, the transport of the labels to the surface of the items of mail represents a general problem if the labels have a self-adhesive surface.

U.S. Pat. No. 5,200,007 describes an apparatus for the application of labels to flat items of mail, which are conveyed in separated form standing on edge along a conveying path by means of a conveying apparatus. It has a label conveying apparatus for conveying the labels, which are located on a substrate, said apparatus being controlled by a sensor device for determining the front edge of the item of mail and a pressure and applicator apparatus for applying/pressing the labels onto the surface of the items of mail. In this apparatus, the labels are printed with distribution information. Labeling at high transport speeds of the items of mail is not possible with this.

A labeling apparatus has also been disclosed in which the address labels are applied to items of mail by means of a round applicator drum which, in its surface, has openings with a controllable vacuum to hold the labels temporarily. The feeding and the cutting of the label webs is carried out in such a way that labels without addresses are not applied (U.S. Pat. No. 4,421,587).

DE 36 22 502 A1 describes a labeling head machine in which the labels on the labeling head, which presses the labels onto the object, are held with the aid of openings in the surface of the head, which are connected to a vacuum source.

If the label can be pushed onto the pressure and applicator drum only when the latter is at rest, during each application operation it is necessary for the drum to be accelerated from a standstill to a peripheral speed corresponding to the transport speed of the flat objects, at which speed the label is applied to the object transported past the pressure and applicator drum. The pressure roller and applicator drum are then braked in such a way that they come to a standstill in the initial position again after one revolution.

On account of various influences, for example belt expansion of a top belt system for transporting letters, the transport speed at which the letters are transported past the pressure and applicator drum varies continuously.

If the respective label is always to be placed accurately at a predefined point on the letter, in spite of the speed fluctuations, then a great deal of expenditure on open-loop and closed-loop control is needed for this.

SUMMARY OF THE INVENTION

The invention is based on the object of providing a method for the application of self-adhesive labels to flat objects transported along a conveying path at fluctuating speed, by means of a pressure and applicator drum driven under control, in which the drive of the pressure and applicator drum is regulated with little expenditure in such a way that each label is applied to the respective object at a defined distance from the front edge of the object.

On account of the surprising fact that the labels are applied to the objects with high quality even when the transport speed and the peripheral speed of the pressure and applicator drum differ (up to 50%), the pressure and applicator drum is operated at a fixed application peripheral speed corresponding to an average transport speed of the objects. In order that the desired distance of the label from the front edge of the object is maintained even given fluctuating transport speeds, the acceleration starting time merely needs to be varied appropriately as a function of the measured speed and position of the respective item of mail.

Since the pressure and applicator drum always needs to be accelerated to a standard peripheral speed corresponding to the average transport speed, the acceleration time for an acceleration profile is defined in the run-up thereto, taking into account the available drive torque and the moment of inertia resulting from the design of the pressure and applicator drum and is taken into account as a constant in determining the start time.

It is advantageous to match the acceleration profile to the periphery of the pressure and applicator drum and the average transport speed to the available acceleration time and the acceleration travel. For this purpose, the pressure and applicator drum is accelerated beyond the peripheral speed corresponding to the average transport speed and is then braked to the peripheral speed corresponding to the average transport speed.

It is also advantageous to match the braking phase to time conditions, by the peripheral speed being increased briefly above the application speed.

In a further advantageous refinement, a different acceleration profile is defined for each transport speed range.

The invention will be explained in more detail below in an exemplary embodiment, using the drawing, in which:

DETAILED DESCRIPTION

Figure 1:
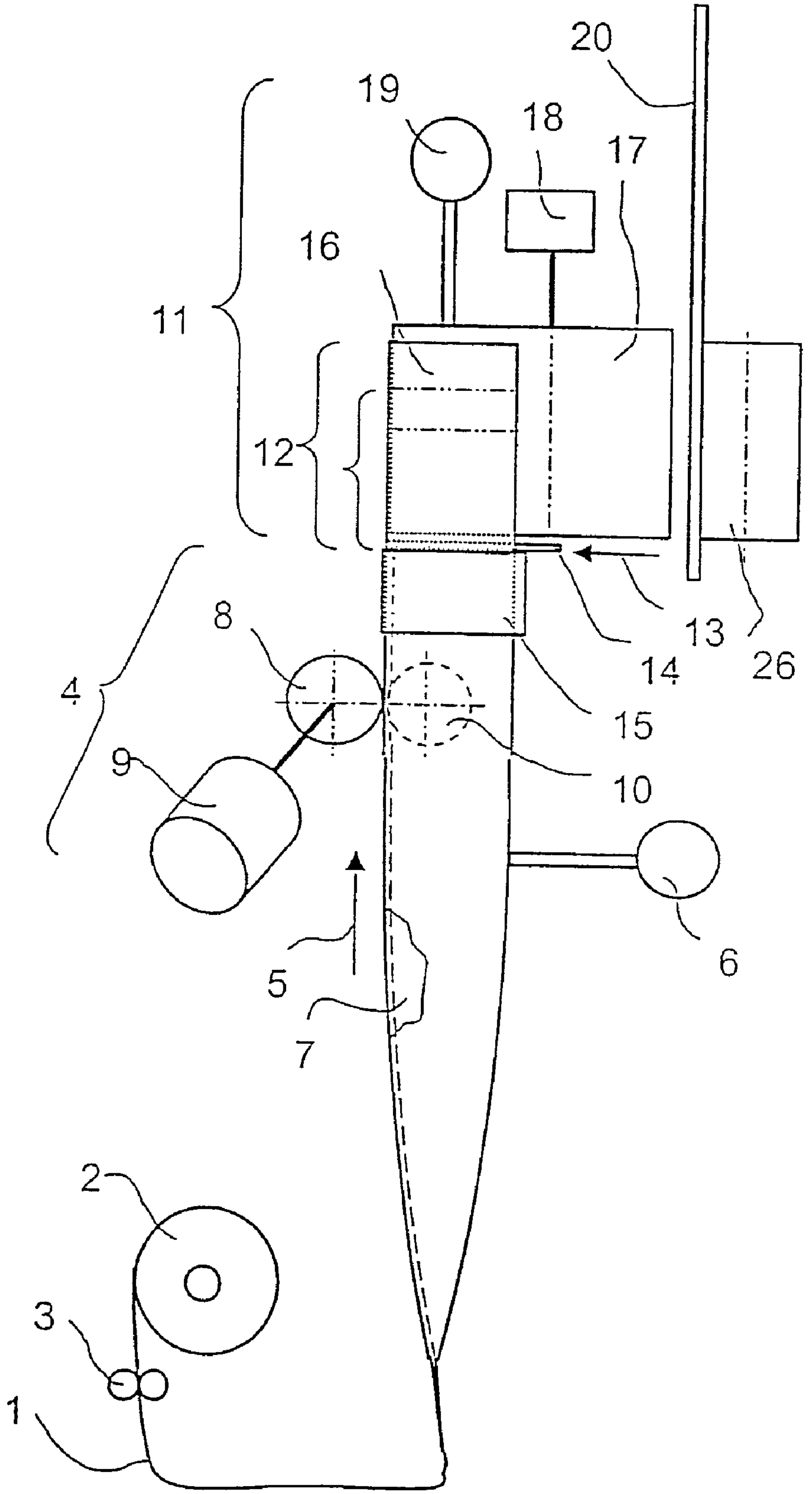
FIG. 1 shows a schematic side view of a device for the application of self-adhesive, substrate-free labels to flat objects.

A self-adhesive label strip 1 is drawn off a supply roll 2 in strip form by a label strip unrolling device 3, known per se, and is supplied to a label conveying and cutting device 4.

In the label conveying and cutting device 4, the label strip 1 is pushed forward onto a pressure and applicator drum 17 at right angles to the transport plane of the flat objects 20 in accordance with the requisite length and cut off with the pressure and applicator drum 17 at a standstill. To this end, the label strip 1 is guided over a shaped guide 7 which, in the label strip advance direction 5, changes from a slightly curved or uncurved guide surface at the entry into a guide surface at the exit having curvature matched to the surface of the pressure and applicator drum 17 which accommodates the labels.

In the surface of the guide 7 there are openings which are connected to a vacuum source 6. Integrated into the guide 7 is a motor-controlled friction wheel drive, comprising a friction wheel 8 with drive 9 and pressure roller 10. The label strip 1 is therefore pushed in the direction of the labeling apparatus 11, comprising the pressure and applicator drum 17 which, on the accommodating part, likewise has openings connected to a vacuum source 19, a drum drive 18 and a spring-mounted opposing roll 26, and is itself changed to a cylindrical shape.

After the label strip 1 has been pushed forward with the aid of the friction wheel drive as far as a height 12, which can be determined freely within certain limits, above the knife device, the knife drive 13 drives the knife 14 over the label strip 1 onto the opposing knife 15 and cuts off a label 16. The label 16 is then carried only by the pressure and applicator drum 17.

On a suitable transport means, not illustrated, for example a top belt system in which flat objects are transported clamped in, the objects 20 to be labeled are led past the labeling apparatus 11 along a path on the side facing away from the label conveying and cutting device 4.

During the cutting of the label strip 1, the pressure and applicator drum 17 remains at a standstill. It is then accelerated with the label 16. The regulation of the movement sequence of the pressure and applicator drum is carried out by means of a controller, as will be described in more detail, in such a way that when the part of the pressure and applicator drum 17 with the label 16 meets the path of the object, specifically accurate acceptance of the self-adhesive label 16 by the object 20 is possible. The circumference of the pressure and applicator drum 17 is shaped outward in a first region and in a second region. The first circumferential region has a circular curvature, the center being located in the axis of rotation. In the second circumferential region, the circumferential surface is displaced inward until disruptive contact between the objects 20 which, for example, are provided with labels in a second, following device, is avoided when in the rest position. This circumferential surface can likewise have the same circular curvature as in the case of the first circumferential region, but the centre is displaced beyond the axis of rotation. The two circumferential regions are connected by appropriate transition regions. The effect of this is that, firstly, in the rest phases, that is to say during label cutting or during application pauses, the pressure and applicator drum 17 cannot project into the path of the objects, and therefore the objects 20 or parts thereof cannot be affected. Secondly, during application, a certain uniform pressure can be exerted against the flat objects in order to transfer the self-adhesive label 16. In order to assist the transfer of the label to the objects 20, an opposing pressure can be produced by the corotating pressure roller 26.

This effect, achieved by the different circumferential regions of the pressure and applicator drum 17 with the axis of rotation physically fixed, can also be achieved if the pressure and applicator drum 17 is constructed as a circular cylinder and if it is mounted such that it can move in the direction of the objects 20. For the purpose of application, it is then moved in the direction of the object such that the label can be pressed on and, in the event of non-application, it is moved back in such a way that contact with the objects 20 is avoided. This embodiment is not illustrated in the drawing, but can readily be implemented by those skilled in the art on the basis of their specialist ability.

Figure 2:
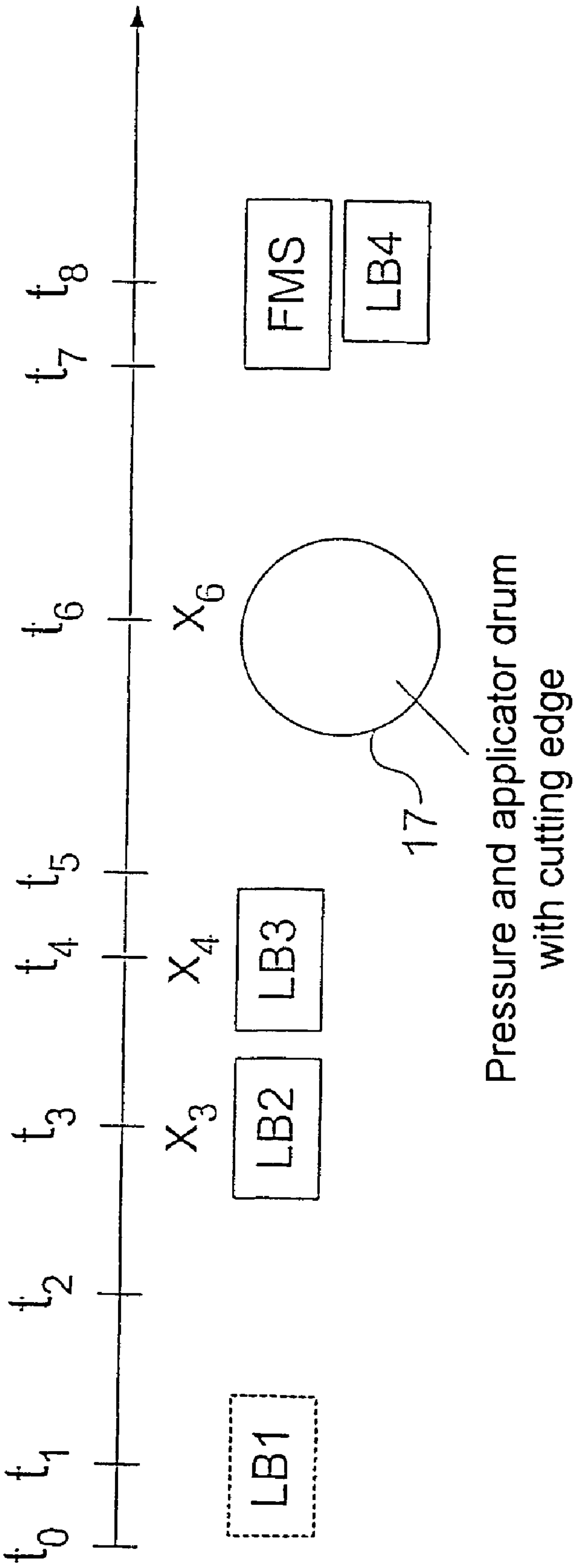
FIG. 2 shows a schematic side view of the device pivoted through 90° with respect to the illustration in FIG. 1, with specific times during the transport of an object.

A labeling device for letters is illustrated schematically in FIG. 2.

The labeling procedure always follows the following steps:

1. label advance;
2. cut label;
3. measure current speed, determine the starting time for the pressure and applicator drum 17 and start the drum at the calculated time; in this case the movement sequence is a complex procedure which is composed of repeated acceleration, braking and constant speed phases;
4. apply the label;
5. brake the drum and stop it in the initial position.

The following illustration describes the basic labeling procedure.

The sequences of the labeling procedure are controlled by the course of the letter. The times $t_i$ specified in the following text vary with the dynamics of successive labeling procedures.

1. At the time $t_0$ (determined by the letter tracking of the machine control system), the higher-order machine control system sends a message related to the item of mail to the labeling controller, with the following information:
   letter ID,
   label/no label,
   label height.
2. The passing of the front edge of the item of mail $t_1$ at light barrier $LB_1$ starts the label advance. If the label advance is carried out at the end of the preceding application procedure, then it must be ensured that the pressure and applicator drum has reached the initial position before the start of cutting.
3. Start the knife drive at the time $t_2$. The movement of the knife is synchronized such that the cutting begins only after the label advance has been completed. The knife drive completes a 360° revolution during each cut; the end position is monitored by a position transmitter.
4. Measurement of the current speed of the item of mail, using the light barriers LB2 and LB3. From the measured running time $t_4-t_3$, which is a measure of the current speed, the starting time $t_5$ for the pressure and applicator drum 17 is calculated. This measurement ensures higher accuracy as compared with the usual indirect measurement of the speed via the belt cycle rate, since the belt is subject to oscillations.

Surprisingly, it has been established that a differential speed between the course of the letter and pressure and applicator drum 17 is uncritical in wide limits (<50%) for the labeling application procedure. On this basis, for specific belt speed ranges, in each case a constant pressure and applicator drum speed is used as a basis in the concept. The belt speed-dependent correction of the horizontal label position is carried out by varying the starting time of the drum in relation to the front edge of the item of mail.

5. Start the applicator drum $t_5$. The acceleration procedure takes place in accordance with a trajectory determined in advance (off-line) and ensures the appropriate horizontal positioning accuracy. In this case, the front edge of the label meets the letter (merge point) at the time $t_6$.
6. After the end of the application $t_7$, the start of the braking phase takes place at the time $t_8$, until the pressure and applicator drum 17 is located in the initial position again.
7. After the label has been applied to the item of mail, the pressure and applicator drum is moved into the initial position. This position is monitored by a position transmitter.
8. A label checker (FMS) comprises a colored mark sensor and reference light barrier (LB4) for the front edge of the letter. The front edge of the letter is determined at the time $t_7$ and the front edge of the label is determined at the time $t_8$. The difference represents the label position on the item of mail at the current measured speed $v_i$ . Items of mail with missing labels or excessively large positioning deviations of the label are rejected. Systematic positioning deviations are used for the long-term readjustment of the applicator controller.
9. After $t_8$ a result message is sent to the higher-order machine control system, with the following content:
   letter ID (0 represents 'phantom item of mail'),
   label status (OK, failed),
   label position (based on the front edge of the item of mail).

Figure 3:
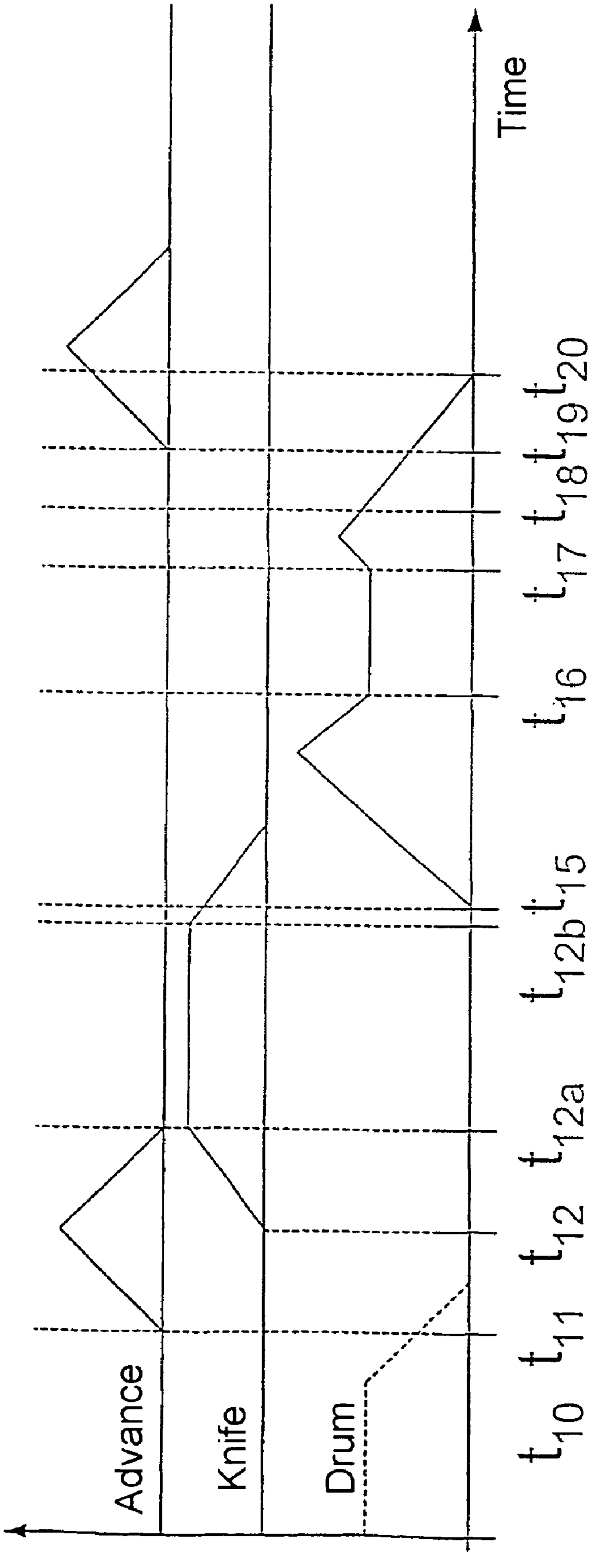
FIG. 3 shows the speed-time sequence for the drives of the labeling device.

The speed-time sequence for the drives directly responsible for the labeling procedure is illustrated in FIG. 3.

The cycle is triggered by a start message and begins with the label advance ($t_{11}$). During the advance, the speed of the item of mail is measured and the knife drive is started ($t_{12}$), cut after the completion of the advance ($t_{12a}$, $t_{12b}$), drum start ($t_{15}$) after the end of the cut ($t_{12b}$), the label meets the item of mail at the time $t_{16}$ and is then rolled onto the item of mail, the following label cycle begins even before the initial position of the label drum has been reached ($t_{20}$), the drum initial position is reached ($t_{19}$), in order to shorten the braking time of the pressure and applicator drum, this is again briefly accelerated above the application speed and then braked.

Here, the meanings are as follows:

$t_{10}$ is the mail ID message from the higher-order control system $t_{11}$ start the label advance $t_{12}$ start the knife drive $T_{12a}$, $t_{12b}$ are the start, end of the label cut $T_{15}$ start the pressure and applicator drum $T_{16}$ start the label application (merge point)

$T_{17}$ end of the application $T_{18}$ start of the braking phase $T_{20}$ start label advance of the next labeling cycle $T_{19}$ reaching the drum initial position In normal operation, the drive belts run at a constant speed. The current speed of the item of mail is determined by a run-time measurement between the measuring light barriers LB2 and LB3.

The current speed of the item of mail is determined by the measurement of the run time $t_9$ of the item of mail between the measuring light barriers LB2 at the position $x_3$ and LB3 at the position $x_4$. In the process, for a short time a constant speed of the item of mail between the light barrier LB2 and the pressure and applicator drum 17 is assumed.

$$t_9=t_4-t_3 \quad \text{(I)}$$

After the item of mail has passed the second measuring light barrier at $x_4$, the run time ($t_{64}$) to the merge point ($x_6$) can be projected.

$$t_{64}=t_6-t_4=t_9*\frac{x_6-x_4}{x_4-x_3} \quad \text{(II)}$$

The control concept assumes that, for a fixed range of the belt speed, the pressure and applicator drum 17 is always accelerated with the same speed trajectory and therefore always needs the same time from the start as far as the merge time. The drum acceleration time $T_{Tr}$ is therefore a constant parameter from the belt speed range. The starting time $t_5$ of the drum, based on $t_4$, is then given by (III).

$$t_5=t_4+t_{64}-T_{Tr} \quad \text{(III)}$$

What is claimed is:

1. A method for the application of self-adhesive labels to flat objects transported along a conveying path, by means of a pressure and applicator drum driven under control, the respective label being pushed onto the pressure and applicator drum when the latter is at rest and held on it by means of vacuum, the pressure and applicator drum then being accelerated in such a way that the peripheral speed of the label on the pressure and applicator drum during application for specific transport speed ranges always corresponds to a defined, average transport speed of the flat objects and, following the application of the label, the pressure and applicator drum being braked in such a way that it comes to a standstill again in the initial position after one revolution, the method comprising the steps:

off-line, before the application procedures, determining the acceleration times of the acceleration profiles, respectively the same in the specific transport speed ranges, from the starting time of the pressure and applicator drum as far as the peripheral speed, corresponding to the defined, average transport speed of the objects, of the circumferential region accommodating the labels;

measuring the times at which the front edge of the respective object passes two sensor devices located one after another in the transport path before the pressure and applicator drum and determining the starting time of the pressure and applicator drum in accordance with the relationship $$t_5=t_4+(t_4-t_3)*\frac{x_6-x_4}{x_4-x_3}-T_{Tr}$$

where $x_3$ is the position of the first sensor device in the transport direction, $x_4$ is the position of the second sensor device in the transport direction, $x_6$ is the position at which the front edge of the label and object are led together, $t_3$ is the time: front edge of the object at $x_3$, $t_4$ is the time: front edge of the object at $x_4$, $t_5$ is the starting time of the pressure and applicator drum, $T_{Tr}$ is the acceleration time of the pressure and applicator drum to a peripheral speed, corresponding to the respective average transport speed of the objects, of the circumferential region accommodating the labels.

2. The method as claimed in claim 1, the pressure and applicator drum being accelerated in the acceleration profile to an appropriate peripheral speed above the average transport speed and then being braked to the peripheral speed corresponding to the average transport speed.

3. The method as claimed in claim 1, following the application of the label, the pressure and applicator drum being accelerated above the application speed and then being braked.

4. The method as claimed in claim 1, a different acceleration profile being defined for each selected transport speed range.

5. A method for the application of labels to a flat objects transported along a conveying path wherein a label is positioned on an applicator drum when the drum is in an initial position, then accelerating the drum to a speed where the peripheral speed of the label on the applicator drum is substantially the same as the average transport speed of the flat objects, applying the label to a flat object and braking the drum such that the drum stops at the initial position after one revolution, the method comprising:

determining the time required to accelerate the drum to a peripheral speed corresponding to the average transport speed of the objects;

measuring the time at which the front edge of the respective object passes first and second sensor devices located one after another in the transport path before the applicator drum and determining the starting time of the pressure and applicator drum in accordance with the relationship:

$$t_5 = t_4 + (t_4 - t_3) * \frac{x_6 - x_4}{x_4 - x_3} - T_{Tr}$$

where $x_4 - x_3$ equals the distance between the first and second sensor devices;

$x_6 - x_4$ equals the distance between the second sensor device and the location where the label first contacts the flat object;

$t_4 - t_3$ equals the time required for the leading edge of the flat object to travel from the first position sensor to the second position sensor $t_5$ is the starting time of the pressure and applicator drum, $T_{Tr}$ is the time required for the applicator drum to accelerate to a peripheral speed corresponding to the respective average transport speed of the objects; and starting the applicator drum at $t_5$ for each flat article to be labeled.

6. The method of claim 5 further comprising determining an acceleration profile for the applicator drum corresponding to the average transport speed.

7. The method of claim 6 further comprising utilizing the acceleration profile to determine $t_5$ such that the applicator drum is accelerated to a peripheral speed above the average transport speed of the flat objects; and then braking the applicator drum to a peripheral speed corresponding to the average transport speed.

8. The method of claim 6, further comprising utilizing the acceleration profile to determine $t_5$ such that after the label is applied to the flat object, the applicator drum accelerates above the average transport speed; and then braking the applicator drum such that the drum stops at the initial position.

9. The method of claim 5 further comprising determining a plurality of acceleration profiles for the applicator drum each corresponding to a selected transport speed. range.

10. The method of claim 5 further comprising the step of determining values for $T_{Tr}$ for the applicator drum corresponding to a plurality of selected transport speed ranges.

11. The method of claim 5 further comprising:

rejecting the flat object if the label is one of:

missing from the flat object after passing the applicator drum; and not positioned in the desired location on the flat object.

12. A method of applying a label to a mail piece in a stream of mail pieces moving past a rotary label applying member, the label applying member starting at an initial position and accelerating to a velocity corresponding to the average velocity of mail pieces in the stream of mail pieces to apply the label to the mail piece, comprising the steps of:

determining the time required to accelerate the label applying member to a rotational velocity corresponding to the average velocity of mail pieces in the stream of mail pieces to be labeled;

measuring the time at which the front edge of the mail piece passes first and second sensor devices located one after another in the transport path of the mail pieces leading to the label applying member and determining a start time at which to begin accelerating the label applying member according to the relationship:

$$t_5 = t_4 + (t_4 - t_3) * \frac{x_6 - x_4}{x_4 - x_3} - T_{Tr}$$

where $x_4 - x_3$ equals the distance between the first and second sensor devices;

$x_6 - x_4$ equals the distance between the second sensor device and the location where the label first contacts the mail piece;

$t_4 - t_3$ equals the time required for the leading edge of the flat object to travel from the first sensor to the second sensor $t_5$ is the starting time of the label applying member, $T_{Tr}$ is the time required for the label applying member to accelerate to a rotational speed corresponding to the average transport speed of the mail pieces in the stream;

and then accelerating the mail piece labeling member beginning at $t_5$ to label the mail piece.

13. The method of claim 12 further comprising the step of positioning the label on the label applying member before accelerating the label applying member.

14. The method of claim 12 further comprising the step of using a vacuum to retain the label on the label applying member.

15. The method of claim 12 further comprising determining an acceleration profile for the rotary label applying member and utilizing the acceleration profile to determine $t_5$ such that the label applying member is accelerated to a speed above the average transport speed of the mail pieces in the stream of mail pieces and then braking the label applying member to a speed corresponding to the average transport speed of the mail pieces.

16. The method of claim 12 further comprising:

determining whether the label is one of:

missing from the mail piece after passing the label applying member;

not positioned in the desired location on the flat object; and rejecting the mail piece if the label is one of missing or not positioned in the desired location.

* * * * *